(12) United States Patent
AlSharif (10) Patent No.: US 12,345,670 B2
(45) Date of Patent: Jul. 1, 2025

(54) HYDROGEL-BASED pH SENSORS AND USE THEREOF

(71) Applicant: Saudi Arabian Oil Company, Dhahran (SA)

(72) Inventor: Layan Alaeddin AlSharif, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 264 days.

(21) Appl. No.: 18/301,173

(22) Filed: Apr. 14, 2023

(65) Prior Publication Data
US 2024/0345014 A1 Oct. 17, 2024

(51) Int. Cl.
*G01N 27/22* (2006.01)

(52) U.S. Cl.
CPC ........... *G01N 27/22* (2013.01); *G01N 27/221* (2013.01)

(58) Field of Classification Search
CPC .............................. G01N 27/22; G01N 27/221
See application file for complete search history.

(56) References Cited

U.S. PATENT DOCUMENTS

| | | | |
|---|---|---|---|
| 8,069,735 B1* | 12/2011 | Egorov | G01L 1/146 73/862.041 |
| 8,244,078 B2 | 8/2012 | Hendriks et al. | |
| 8,840,839 B2 | 9/2014 | Iordanov et al. | |
| 2019/0277790 A1* | 9/2019 | Geng | G01N 27/745 |
| 2019/0282173 A1 | 9/2019 | Starr et al. | |

OTHER PUBLICATIONS

Caucheteur et al., "Review of plasmonic fiber optic biochemical sensors: improving the limit of detection," Analytical and Bioanalytical Chemistry, Jan. 24, 2015, 407:3883-3897, 15 pages.
Hendi et al., "Healthcare Applications of pH-Sensitive Hydrogel-Based Devices: A Review," International Journal of Nanomedicine, Jun. 2, 2020, 15:3887-3901, 15 pages.
Hoare et al., "Hydrogels in drug delivery: Progress and challenges," Polymer, Apr. 15, 2008, 49(8):1993-2007, 15 pages.
Kchit et al., "Electrical resistivity mechanism in magnetorheological elastomer," Journal of Physics D: Applied Physics, Apr. 30, 2009, 42(105505):1-8, 8 pages.
Liao et al., "A comprehensive thermo-viscoelastic experimental investigation of Ecoflex polymer," Polymer Testing, Jun. 2020, 86(106478):1-13, 13 pages.
Mu et al., "Hydrogel Coated Flexible Ph Sensor System for Fish Spoilage Monitoring," SSRN Electronic Journal, Apr. 22, 2022, 16 pages.
Richter et al., "Review on Hydrogel-based pH Sensors and Microsensors," Sensors, Jan. 25, 2008, 8:561-581, 21 pages.
Roberts et al., "Soft-Matter Capacitive Sensor for Measuring Shear and Pressure Deformation," 2013 IEEE International Conference on Robotics and Automation (ICRA), May 6-10, 2013, 3529-3534, 6 pages.

(Continued)

*Primary Examiner* — Amy He
(74) *Attorney, Agent, or Firm* — Fish & Richardson P.C.

(57) ABSTRACT

The present disclosure relates to sensors including a dielectric layer disposed between a first electrode layer and a second electrode layer, and a sensing layer including a pH-sensitive hydrogel disposed on an outer surface of the second electrode layer.

30 Claims, 4 Drawing Sheets

(56) References Cited

OTHER PUBLICATIONS

Wu et al., "Ultrasensitive, stretchable, and transparent humidity sensor based on ion-conductive double-network hydrogel thin films," Science China Materials, May 12, 2022, 65(9):2540-2552, 13 pages.

Yao et al., "Curing quality monitoring and loading detection of composite structures with embedded capacitive sensor array," Materials & Design, Jan. 2022, 213(110321):1-12, 12 pages.

Zhang et al., "A pH Sensor Based on a Microcantilever Coated with Intelligent Hydrogel," Instrumentation Science & Technology, 2004, 32(4):361-369, 9 pages.

Zhao et al., "Smart hydrogel-based optical fiber SPR sensor for pH measurements," Sensors and Actuators B: Chemical, May 15, 2018, 261:226-232, 7 pages.

\* cited by examiner

HYDROGEL-BASED pH SENSORS AND USE THEREOF

TECHNICAL FIELD

The present disclosure relates to hydrogel-based sensors for determining pH, as well as methods of use thereof.

BACKGROUND pH analysis is widely used in applications such as corrosion control, water treatment, and food and beverage safety. pH is an important physical parameter in, for example, oil and gas applications, as it provides a direct indication of corrosion and solids accumulation. However, conventional methods for monitoring pH, such as insertion probes or off-site laboratory analysis, can require invasive, point-specific sampling, and can require expensive and/or bulky instrumentation. These techniques can be unsuitable for monitoring of pH levels, for example, in oil and gas pipelines. Additionally, delays between sampling and analysis using such techniques can limit the usefulness of results.

SUMMARY

Provided in the present disclosure is a sensor including a first electrode layer, a second electrode layer, a dielectric layer disposed between the first electrode layer and the second electrode layer, and a sensing layer disposed on an outer surface of the second electrode layer. The first electrode layer and the second electrode layer each independently include a magnetorheological elastomer, the dielectric layer includes a non-conductive elastomer, and the sensing layer includes a pH-sensitive hydrogel.

In some embodiments, each instance of the magnetorheological elastomer independently includes a matrix, a ferromagnetic particle, and a filler. In some embodiments, each instance of the matrix independently includes a natural rubber, a silicone rubber, a romobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. In some embodiments, each instance of the matrix includes a silicone rubber.

In some embodiments, each instance of the ferromagnetic particle independently includes iron, cobalt, nickel, neodymium, boron, or any mixture thereof. In some embodiments, each instance of the ferromagnetic particle includes carbonyl iron.

In some embodiments, each instance of the filler independently includes graphite, graphene, a carbon nanotube, carbon black, or any combination thereof. In some embodiments, each instance of the filler includes a multiwall carbon nanotube.

In some embodiments, the non-conductive elastomer includes a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. In some embodiments, the non-conductive elastomer includes a silicone rubber.

In some embodiments, the pH-sensitive hydrogel includes a polymer including an amino group, a carboxylic acid group, an amide group, or any combination thereof. In some embodiments, the pH-sensitive hydrogel includes a polymer including an acrylic acid monomer unit, a methacrylic acid monomer unit, an acrylamide monomer unit, a methacrylamide monomer unit, an N,N-dimethylaminoethyl methacrylate monomer unit, a poly(ethylene glycol) dimethacrylate monomer unit, an ethyleneimine monomer unit or any combination thereof. In some embodiments, the polymer further includes a vinyl alcohol monomer unit, a hydroxyethyl methacrylate monomer unit, an isooctyl acrylate monomer unit, a poly(ethylene glycol) dimethacrylate monomer unit, or any combination thereof. In some embodiments, the pH-sensitive hydrogel includes a poly(vinyl alcohol)-poly(acrylic acid) polymer.

In some embodiments, the sensing layer includes a non-conductive domain and a sensing domain disposed in the non-conductive domain, wherein the sensing domain includes the pH-sensitive hydrogel. In some embodiments, the sensing domain includes a convex surface oriented towards the second electrode layer. In some embodiments, the sensing domain is semi-spherical.

In some embodiments, the dielectric layer directly contacts the first electrode layer and the second electrode layer; and the sensing layer directly contacts the outer surface of the second electrode layer. In some embodiments, the sensor further includes a first electrical connection to the first electrode layer; and a second electrical connection to the second electrode layer.

Also provided in the present disclosure is a method of determining pH, including contacting a sample with the sensing layer of a sensor of the present disclosure; measuring a capacitance between the first electrode layer and the second electrode layer; and determining a pH of the sample based on the capacitance. In some embodiments, determining the pH of the sample includes comparing the capacitance to a calibration curve.

Also provided in the present disclosure is a sensor array including a first electrode layer; a second electrode layer; a dielectric layer disposed between the first electrode layer and the second electrode layer; and a sensing layer disposed on an outer surface of the second electrode layer. The first electrode layer includes a plurality of first conductive domains extending parallel to a major axis; the second electrode layer includes a plurality of second conductive domains extending perpendicular to the major axis; each of the first conductive domains and the second conductive domains independently includes a magnetorheological elastomer; the dielectric layer includes a non-conductive elastomer; and the sensing layer includes a plurality of sensing domains including a pH-sensitive hydrogel, each disposed on a minor axis intersecting an instance of the plurality of first conductive domains and an instance of the plurality of second conductive domains.

In some embodiments, each first conductive domain and second conductive domain independently includes a magnetorheological elastomer including a matrix, a ferromagnetic particle, and a filler. In some embodiments, the first electrode layer includes a plurality of first non-conductive domains separating each of the plurality of first conductive domains; and the second electrode layer includes a plurality of second non-conductive domains separating each of the plurality of second conductive domains.

In some embodiments, the sensing layer includes one or more third non-conductive domains separating each of the plurality of sensing domains. In some embodiments, each first non-conductive domain, second non-conductive domain, and third non-conductive domain, and each instance of the matrix independently includes a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof.

In some embodiments, each instance of the pH-sensitive hydrogel independently includes a polymer including an amino group, a carboxylic acid group, an amide group, or any combination thereof. In some embodiments, each sensing domain includes a convex surface oriented towards the second electrode layer.

In some embodiments, the sensory array further includes a plurality of first electrical connections, each independently to an instance of the plurality of first conductive domains; and a plurality of second electrical connections, each independently to an instance of the plurality of second conductive domains.

Also provided in the present disclosure is a method of determining pH, including contacting a first sample with a first sensing domain of a sensor array of the present disclosure; measuring a first capacitance between an instance of the plurality of first conductive domains and an instance of the plurality of second conductive domains intersecting a first minor axis extending through the first sensing domain; determining a pH of the first sample based on the first capacitance; contacting a second sample with a second sensing domain; measuring a second capacitance between an instance of the plurality of first conductive domains and an instance of the plurality of second conductive domains intersecting a second minor axis extending through the second sensing domain; and determining a pH of the second sample based on the second capacitance.

DETAILED DESCRIPTION

The present disclosure relates to sensors including a dielectric layer disposed between a first electrode layer and a second electrode layer, and a sensing layer including a pH-sensitive hydrogel disposed on an outer surface of the second electrode layer. Because pH-responsive changes in the volume of the hydrogel can affect the distance between the first and second electrode layers by increasing or decreasing the pressure applied to the second electrode layer, the capacitance between the first and second electrode layers can be correlated to the pH of the local environment of the sensing layer. The sensors described herein can be flexible, and can provide continuous, in situ pH monitoring. The present disclosure also relates to arrays of such sensors, including a dielectric layer disposed between a first electrode layer and a second electrode layer including perpendicularly oriented conductive domains and, disposed on an outer surface of the second electrode layer, a sensing layer including pH-sensitive hydrogel-containing sensing domains positioned in-line with each point of overlap between conductive domains of the first and second electrode layer. In such arrays, capacitance (and accordingly, pH) can be individually determined for each point of overlap, providing for in-situ mapping of local pH across the array.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Figure 1:
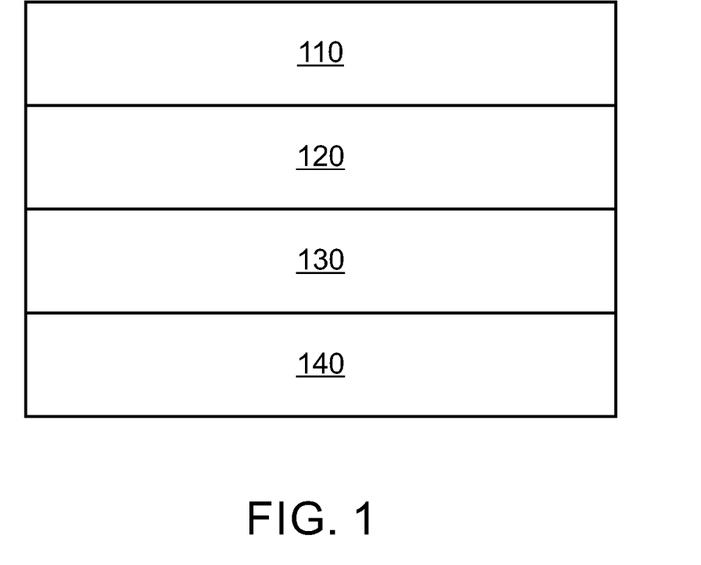
FIG. 1 is a schematic illustration of a sensor according to an embodiment of the present disclosure.

FIG. 1 shows a schematic of a sensor 100 according to an embodiment of the present disclosure. Sensor 100 includes a dielectric layer 120 disposed between a first electrode layer 110 and a second electrode layer 130, and a sensing layer 140 disposed on an outer surface of the second electrode layer 130.

The first electrode layer and the second electrode layer each include a magnetorheological elastomer. In some embodiments, one or more instances of the magnetorheological elastomer, or each instance of the magnetorheological elastomer, independently includes a matrix and a ferromagnetic particle. In some embodiments, one or more instances of the matrix, or each instance of the matrix, independently includes a natural rubber or a synthetic rubber. In some embodiments, one or more instances of the matrix, or each instance of the matrix, independently includes a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. In some embodiments, one or more instances of the matrix, or each instance of the matrix, includes a silicone rubber, for example, including a room-temperature cured silicone polymer. In some embodiments, the silicone rubber includes polydimethylsiloxane.

In some embodiments, one or more instances of the ferromagnetic particle, or each instance of the ferromagnetic particle, includes iron, cobalt, nickel, neodymium, boron, or any mixture thereof. In some embodiments, one or more instance of the ferromagnetic particle, or each instance of the ferromagnetic particle, includes neodymium, boron, and iron. In some embodiments, one or more instance of the ferromagnetic particle, or each instance of the ferromagnetic particle, includes iron sands. In some embodiments, one or more instance of the ferromagnetic particle, or each instance of the ferromagnetic particle, includes cobalt, nickel, or both. In some embodiments, one or more instances of the ferromagnetic particle, or each instance of the ferromagnetic particle, includes carbonyl iron. In some embodiments, the carbonyl iron includes spherical particles having an average size of about 0.1 µm to about 15 µm, or about 1 µm to about 7 µm. In other embodiments, the carbonyl iron includes flake-type particles having an average size of about 1 µm to about 100 µm, or about 5 µm to about 50 µm. In some embodiments, the carbonyl iron particles are coated. For example, carbonyl iron particles can be coated with organic materials such as poly(methyl methacrylate), polystyrene, polyaniline, or polycarbonate. Carbonyl iron particles can be surface treated, for example, with silane coupling chemicals such as (3-aminopropyl) triethoxysilane. In certain such embodiments, the surface-treated carbonyl iron particles are combined with a matrix including a silicone rubber.

In some embodiments, one or more instances of the magnetorheological elastomer, or each instance of the magnetorheological elastomer, independently includes a filler.

Fillers can enhance the field-dependent properties of the magnetorheological elastomer, the electrical conductivity of the magnetorheological elastomer, or both. The filler can include magnetic fillers, non-magnetic fillers, or both. In some embodiments, one or more instance of the filler, or each instance of the filler, includes iron oxide-containing nanorods, chromium-based particles, or both. In some embodiments, one or more instances of the filler, or each instance of the filler, includes graphite, graphene, a carbon nanotube, carbon black, or any combination thereof. Carbon nanotubes can include single- and multi-wall carbon nanotubes. For example, in some embodiments, one or more instances of the filler, or each instance of the filler, includes a multi-wall carbon nanotube. The magnetorheological elastomers of the present disclosure can include an appropriate amount of filler, such as a multi-wall carbon nanotube, to provide sufficient conductivity for measurement of a capacitance between the first electrode layer and the second electrode layer.

One or more instances of the magnetorheological elastomer can further include other suitable fillers known in the art, such as reinforcing agents, plasticizers, and cross-link agents. For example, in some embodiments, the magnetorheological elastomer further includes a silicone oil, a mineral oil, or both. Such fillers can improve flexibility, flowability, and workability of the magnetorheological elastomer.

In some embodiments, the magnetorheological elastomer includes about 0.1 wt % to about 30 wt % of a filler, for example, about 0.1 wt % to about 25 wt %, about 0.1 wt % to about 15 wt %, about 1 wt % to about 30 wt %, about 1 wt % to about 25 wt %, about 1 wt % to about 15 wt %, about 5 wt % to about 30 wt %, about 5 wt % to about 25 wt %, or about 5 wt % to about 15 wt % of a filler.

The magnetorheological elastomers of the present disclosure can be prepared according to any suitable method. For example, one or more instances of the magnetorheological elastomer, or each instance of the magnetorheological elastomer, can be prepared by mixing a matrix precursor, the ferromagnetic particle, and filler, and curing the mixture. The mixture can optionally be exposed to a magnetic field during curing, to provide an anisotropic magnetorheological elastomer. Alternatively, curing in the absence of a magnetic field can yield an isotropic magnetorheological elastomer.

In some embodiments, the thickness of each of the first electrode layer and the second electrode layer is independently about 0.1 mm to about 50 mm, about 1 mm to about 25 mm, or about 1 mm to about 10 mm.

The dielectric layer includes a non-conductive elastomer. In some embodiments, the non-conductive elastomer includes a natural rubber or a synthetic rubber. In some embodiments, the non-conductive elastomer includes a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. For example, in some embodiments, the non-conductive elastomer includes a silicone rubber. In some embodiments, the silicone rubber includes polydimethylsiloxane. In some embodiments, the non-conductive elastomer and the matrix of one or more instances of the magnetorheological elastomer are the same.

In some embodiments, the thickness of the dielectric layer is about 0.1 mm to about 50 mm, about 1 mm to about 25 mm, or about 1 mm to about 10 mm. In some embodiments, the dielectric layer directly contacts the first electrode layer and the second electrode layer.

The sensing layer includes a pH-sensitive hydrogel. In some embodiments, the pH-sensitive hydrogel includes a chemically cross-linked network of one or more polymers. In some embodiments, the pH-sensitive hydrogel includes a polymer including an ionizable group, such as an amino group, a carboxylic acid group, an amide group, or any combination thereof. For example, in some embodiments, the pH-sensitive hydrogel includes a polymer including an acrylic acid monomer unit, a methacrylic acid monomer unit, an acrylamide monomer unit, a methacrylamide monomer unit, an N,N-dimethylaminoethyl methacrylate monomer unit, a poly(ethylene glycol) dimethacrylate monomer unit, or any combination thereof. In some embodiments, such polymers further include non-ionizable monomer units, such as a vinyl alcohol monomer unit, a hydroxyethyl methacrylate monomer unit, an isooctyl acrylate monomer unit, a poly(ethylene glycol) dimethacrylate monomer unit, an ethyleneimine monomer unit, or any combination thereof.

For example, in some embodiments, the pH-sensitive hydrogel includes a 2-hydroxyethyl methacrylate-N,N-dimethylaminoethyl methacrylate polymer, a poly(hydroxyethyl methacrylate-co-methacrylic acid) polymer, a poly(acrylamide) polymer, a poly(vinyl alcohol)-poly(acrylic acid) polymer, a poly(acrylic acid-co-isooctyl acrylate) polymer, a poly(methacrylic acid)-poly(ethylene glycol) dimethacrylate polymer, a poly(ethylene imine) polymer, or an acrylamide-N,N-dimethylaminoethyl methacrylate polymer. Methods for preparing such pH-sensitive hydrogels are known in the art.

In some embodiments, the pH-sensitive hydrogel is acidic (for example, including a carboxylic acid-containing polymer), and the hydrogel tends to swell in response to increasing pH. In other embodiments, the pH-sensitive hydrogel is basic (for example, including an amino-containing polymer), and the hydrogel tends to swell in response to decreasing pH. The identity and relative amount of ionizable groups of the polymers of the pH-sensitive hydrogel can be selected to provide an appropriate sensitivity for a particular pH range.

Figure 2:
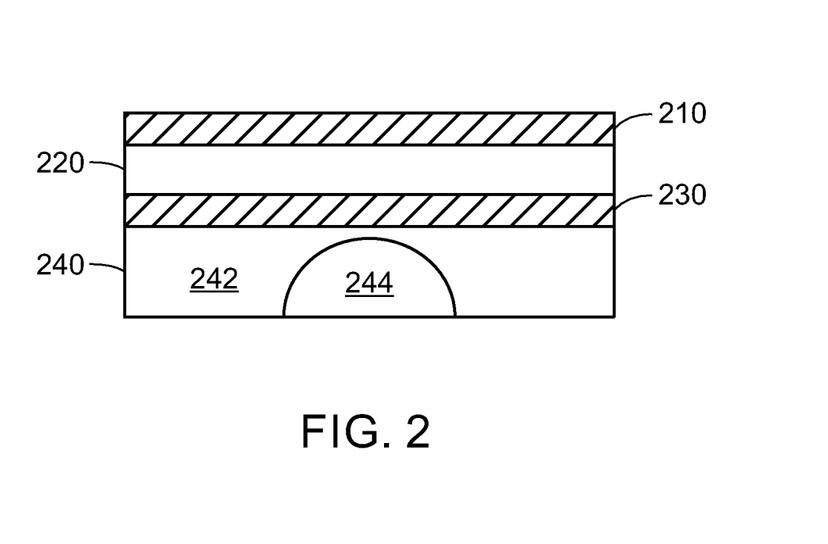
FIG. 2 is a schematic illustration of a sensor according to an embodiment of the present disclosure.

In some embodiments, the sensing layer includes a non-conductive domain and a sensing domain disposed therein. For example, FIG. 2 shows a schematic of a sensor 200 according to an embodiment of the present disclosure. Sensor 200 includes a dielectric layer 220 disposed between a first electrode layer 210 and a second electrode layer 230, and a sensing layer 240 disposed on an outer surface of the second electrode layer 230. The sensing layer includes a non-conductive domain 242 and, disposed in the non-conductive domain 242, a sensing domain 244 including the pH-sensitive hydrogel. The sensing domain 244 includes a convex surface oriented towards the second electrode layer 230.

In some embodiments, the non-conductive domain includes any non-conductive elastomer of the present disclosure. For example, in some embodiments, the non-conductive domain includes a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. For example, in some embodiments, the non-conductive domain includes a silicone rubber.

Figure 3:
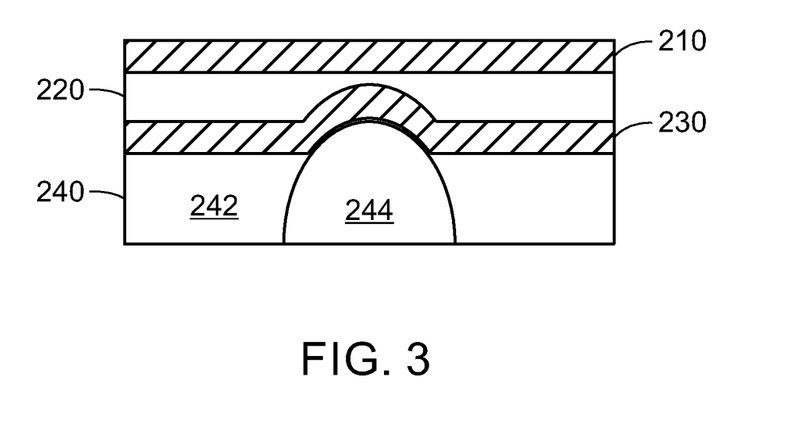
FIG. 3 is a schematic illustration of a sensor according to an embodiment of the present disclosure.

In some embodiments, the sensing domain is semi-cylindrical, semi-ellipsoidal, or semi-spherical. Such convex surfaces, oriented towards the second electrode layer, can provide for increased contact area between the sensing domain and the local environment of the sensor, while allowing for radial expansion of the sensing domain, which can optimize isotropy and capacitance sensitivity. For example, FIG. 3 shows a schematic of sensor 200 following a change in local pH of the sensing layer 240. Upon swelling, radial expansion of sensing domain 244 displaces the second electrode layer 230 and the dielectric layer 220, decreasing the distance between the second electrode layer 230 and the first electrode layer 210. This physical response to changing pH can be detected as a change in capacitance between the second electrode layer 230 and the first electrode layer 210.

The thickness of the sensing layer can be any thickness achievable by a given manufacturing method that permits the sensor to detect changes in deflection. For example, in some embodiments, the thickness of the sensing layer is about 0.1 mm to about 50 mm, about 1 mm to about 25 mm, or about 1 mm to about 10 mm. In some embodiments, the sensing layer directly contacts the outer surface of the second electrode layer. In some embodiments, the sensing domain directly contacts the outer surface of the second electrode layer.

The sensors of the present disclosure can be used with any other useful component. For example, in some embodiments, the sensor further includes electrical connections to the first electrode layer and the second electrode layer. In certain such embodiments, the electrical connections include wires from a power source and/or an electrical property measuring device to each of the first electrode layer and the second electrode layer. The power source can be a constant voltage source. The electrical property measuring device can be an ammeter, ohmmeter, voltmeter, or multimeter. In certain such embodiments, the electrical connections include wires from a power source and a voltmeter to each of the first electrode layer and the second electrode layer. In certain such embodiments, the electrical connections include wires from a power source and an LCR meter to each of the first electrode layer and the second electrode layer. Electrical connections can be provided in any useful manner, such as by patterning, soldering, forming, bonding, milling, casting, depositing, and the like, thereby providing wires, conductive traces, bond pads, or other connections.

The present disclosure also provides a method of determining pH using a sensor of the present disclosure. In some embodiments, the method includes contacting a sample with the sensing layer of a sensor of the present disclosure, measuring a capacitance between the first electrode layer and the second electrode layer, and determining a pH of the sample based on the capacitance. In certain such embodiments, determining the pH of the sample includes comparing the measured capacitance to a calibration curve. Such calibration curves can be prepared, for example, based on capacitance measurements after exposure to standard samples of known pH.

Figure 4:
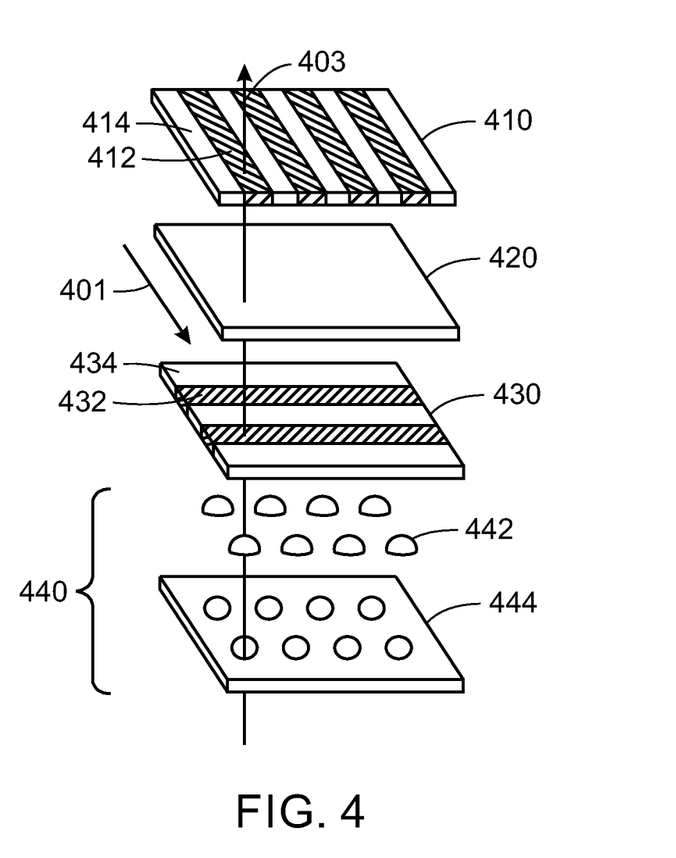
FIG. 4 is a schematic illustration of a sensor array according to an embodiment of the present disclosure.

Also provided are arrays of sensors of the present disclosure. FIG. 4 shows an exploded-view schematic of a sensor array 400 according to an embodiment of the present disclosure. Sensor array 400 includes a dielectric layer 420 disposed between a first electrode layer 410 and a second electrode layer 430, and a sensing layer 440 disposed on an outer surface of the second electrode layer 430.

The first electrode layer 410 includes a plurality of first conductive domains 412 extending parallel to a major axis 401, and the second electrode layer 430 includes a plurality of second conductive domains 432 extending perpendicular to the major axis 401.

Each of the first conductive domains and the second conductive domains independently include a magnetorheological elastomer. One or more instances, or each instance, of the plurality of first conductive domains and the plurality of second conductive domains can independently include any magnetorheological elastomer of the present disclosure. For example, in some embodiments, each first conductive domain and second conductive domain independently includes a magnetorheological elastomer including a matrix of the present disclosure, a ferromagnetic particle of the present disclosure, and a filler of the present disclosure. In certain such embodiments, one or more instances of the matrix, or each instance of the matrix, includes a silicone rubber. In certain such embodiments, one or more instances of the ferromagnetic particle, or each instance of the ferromagnetic particle, includes carbonyl iron. In certain such embodiments, one or more instances of the filler, or each instance of the filler, includes a multi-wall carbon nanotube.

The first electrode layer 410 further includes a plurality of first non-conductive domains 414 separating each of the plurality of first conductive domains 412, and the second electrode layer 430 further includes a plurality of second non-conductive domains 434 separating each of the plurality of first conductive domains 432.

In some embodiments of the sensor array, the thickness of each of the first electrode layer and the second electrode layer is independently about 0.1 mm to about 50 mm, about 1 mm to about 25 mm, or about 1 mm to about 10 mm.

The dielectric layer of the sensor array includes a non-conductive elastomer. In some embodiments of the sensor array, the dielectric layer includes any non-conductive elastomer of the present disclosure. For example, in some embodiments, the non-conductive elastomer includes a natural rubber or a synthetic rubber. In some embodiments, the non-conductive elastomer includes a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. For example, in some embodiments, the non-conductive elastomer includes a silicone rubber. In some embodiments, the silicone rubber includes polydimethylsiloxane. In some embodiments, the non-conductive elastomer and the matrix of one or more instances of the magnetorheological elastomer are the same.

In some embodiments of the sensor array, the thickness of the dielectric layer is about 0.1 mm to about 50 mm, about 1 mm to about 25 mm, or about 1 mm to about 10 mm. In some embodiments, the dielectric layer directly contacts the first electrode layer and the second electrode layer.

The sensing layer 440 includes a plurality of sensing domains 442, each disposed in a third non-conductive domain 444 on a minor axis 403 intersecting an instance of the plurality of first conductive domains 412 and an instance of the plurality of second conductive domains 432.

One or more instances, or each instance, of the plurality of first non-conductive domains, the plurality of second non-conductive domains, and the one or more third non-conductive domains can independently include any non-conductive elastomer of the present disclosure. For example, in some embodiments, each first non-conductive domain, second non-conductive domain, and third non-conductive domain includes a natural rubber or a synthetic rubber. In some embodiments, each first non-conductive domain, second non-conductive domain, and third non-conductive domain includes a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof. In certain such embodiments, each first non-conductive domain, second non-conductive domain, and third non-conductive domain includes a silicone rubber. In some embodiments, the silicone rubber includes polydimethylsiloxane.

One or more instances, or each instance, of the plurality of sensing domains can independently include any pH-sensitive hydrogel of the present disclosure. For example, in some embodiments, each instance of the pH-sensitive hydrogel independently includes a polymer including an ionizable group, such as an amino group, a carboxylic acid group, an amide group, or any combination thereof. In certain such embodiments, each instance of the pH-sensitive hydrogel independently includes a polymer including an acrylic acid monomer unit, a methacrylic acid monomer unit, an acrylamide monomer unit, a methacrylamide monomer unit, an N,N-dimethylaminoethyl methacrylate monomer unit, a poly(ethylene glycol) dimethacrylate monomer unit, an ethyleneimine monomer unit, or any combination thereof. In certain such embodiments, each instance of the pH-sensitive hydrogen includes a poly(vinyl alcohol)-poly(acrylic acid) polymer.

In some embodiments, one or more instances, or each instance, of the plurality of sensing domains is semi-cylindrical, semi-ellipsoidal, or semi-spherical.

In some embodiments of the sensor array, the thickness of the sensing layer is about 0.1 mm to about 50 mm, about 1 mm to about 25 mm, or about 1 mm to about 10 mm. In some embodiments of the sensor array, the sensing layer directly contacts the outer surface of the second electrode layer. In some embodiments, each sensing domain directly contacts the outer surface of the second electrode layer.

The sensor arrays of the present disclosure can be used with any other useful component. For example, in some embodiments, the sensor array further includes a plurality of first electrical connections, each independently to an instance of the plurality of first conductive domains, and a plurality of second electrical connections, each independently to an instance of the plurality of second conductive domains. In certain such embodiments, the electrical connections include wires from a power source of the present disclosure and/or an electrical property measuring device of the present disclosure. In certain such embodiments, the electrical connections include wires from a power source and a voltmeter to a switching module configured to switch between each first conductive domain, and to a switching module configured to switch between each second conductive domains. In certain such embodiments, the electrical connections include wires from LCR meter to a switching module configured to switch between each first conductive domain, and to a switching module configured to switch between each second conductive domains. Electrical connections can be provided in any useful manner, such as by patterning, soldering, forming, bonding, milling, casting, depositing, and the like, thereby providing wires, conductive traces, bond pads, or other connections.

The present disclosure also provides a method of determining pH using a sensor array of the present disclosure. In some embodiments, the method includes contacting a first sample with a first sensing domain of a sensor array of the present disclosure, measuring a first capacitance between an instance of the plurality of first conductive domains and an instance of the plurality of second conductive domains intersecting a first minor axis extending through the first sensing domain, and determining a pH of the first sample based on the first capacitance. In some embodiments, the method includes contacting a second sample with a second sensing domain, measuring a second capacitance between an instance of the plurality of first conductive domains and an instance of the plurality of second conductive domains intersecting a second minor axis extending through the second sensing domain, and determining a pH of the second sample based on the second capacitance.

In certain such embodiments, determining the pH of the first sample includes comparing the first capacitance to a calibration curve. In certain such embodiments, determining the pH of the second sample includes comparing the second capacitance to a calibration curve. Such calibration curves can be prepared, for example, based on capacitance measurements after exposure to standard samples of known pH.

Figure 5:
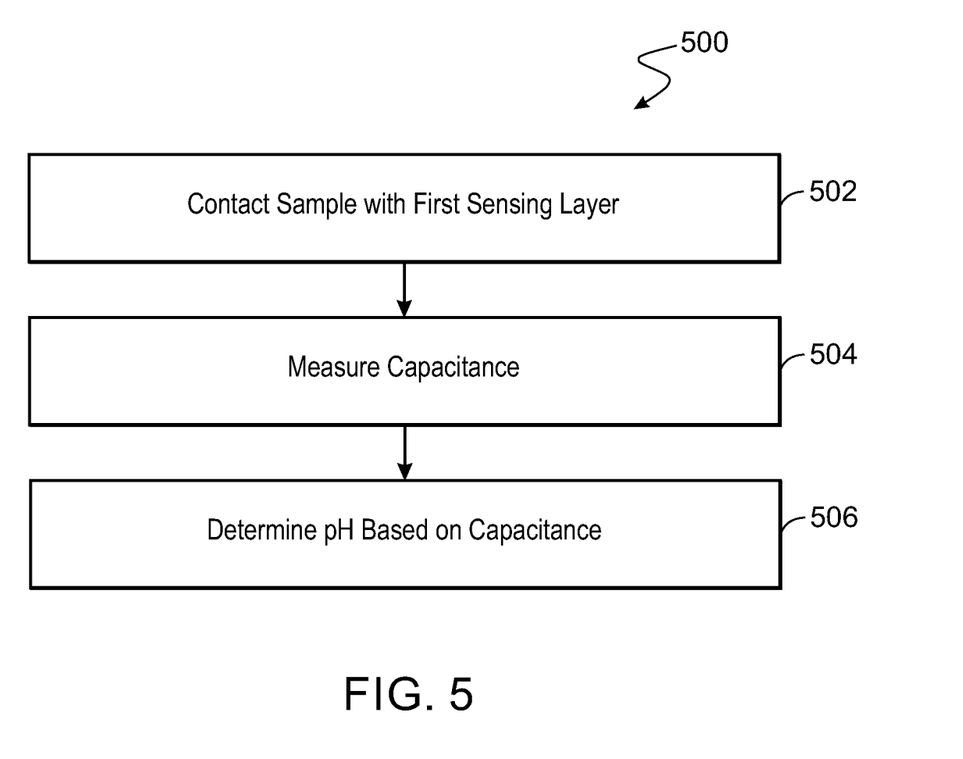
FIG. 5 is a process flow diagram of a method for determining pH.

FIG. 5 is a process flow diagram of a method 500 for determining pH. The method starts at block 502 with the contacting of a sample with the sensing layer of a sensor of the present disclosure. At block 504, a capacitance between the first electrode layer and the second electrode layer is measured. At block 506, a pH of the sample is determined based on the capacitance.

Figure 6:
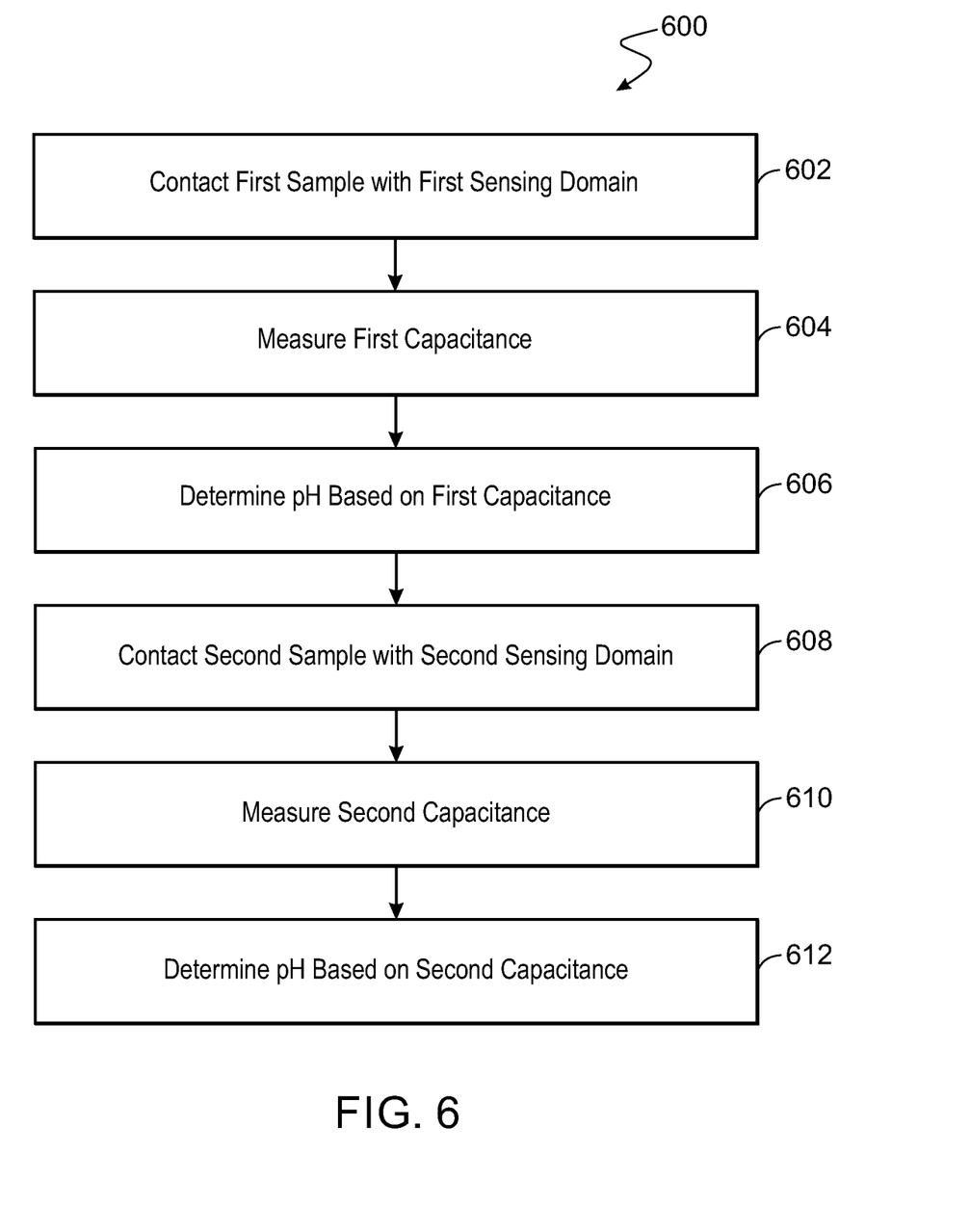
FIG. 6 is a process flow diagram of a method for determining pH.

FIG. 6 is a process flow diagram of a method 600 for determining pH. The method starts at block 602 with the contacting of a first sample with a first sensing domain of a sensor array of the present disclosure. At block 604, a first capacitance between an instance of the plurality of first conductive domains and an instance of the plurality of second conductive domains intersecting a first minor axis extending through the first sensing domain is measured. At block 606, a pH of the first sample is determined based on the first capacitance. At block 608, a second sample is contacted with a second sensing domain of the sensor array. At block 610, a second capacitance between an instance of the plurality of first conductive domains and an instance of the plurality of second conductive domains intersecting a first minor axis extending through the second sensing domain is measured. At block 612, a pH of the second sample is determined based on the second capacitance.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used in the present disclosure can allow for a degree of variability in a value or range, for example, within 10%, within 5%, or within 1% of a stated value or of a stated limit of a range.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

As used in the present disclosure, the term "magnetorheological elastomer" refers to a polymeric material including ferromagnetic particles.

As used in the present disclosure, the term "non-conductive elastomer" refers to an electrically insulating polymeric material.

As used in the present disclosure, the term "monomer unit," used in reference to a polymer, refers to a monomer, or residue of a monomer, that has been incorporated into at least a portion of the polymer.

As used in the present disclosure, the term "polymerization product," used in reference to one or more monomers, refers to a polymer that can be formed by a chemical reaction of the one or more monomers. For example, a "polymerization product" of acrylic acid is a polymer containing acrylic acid monomer units.

As used in the present disclosure, the term "hydrogel" refers to a polymer network which is hydrophilic and contains a relatively large amount of water. As used in the present disclosure, the term "polymer network" refers to a three-dimensional structure including chemically or physically cross-linked polymers.

As used in the present disclosure, the term "pH-sensitive hydrogel" refers to a hydrogel that can undergo a change in volume (for example, by swelling or shrinking) in response to a change in environmental pH. That is, pH-sensitive hydrogels have equilibrium swelling properties that are partially dependent on the pH of the local environment of the hydrogel.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

The invention claimed is:

1. A sensor comprising:
a first electrode layer;
a second electrode layer;
a dielectric layer disposed between the first electrode layer and the second electrode layer; and
a sensing layer disposed on an outer surface of the second electrode layer;
wherein
the first electrode layer and the second electrode layer each independently comprise a magnetorheological elastomer;
the dielectric layer comprises a non-conductive elastomer; and
the sensing layer comprises a pH-sensitive hydrogel.

2. The sensor of claim 1, wherein each instance of the magnetorheological elastomer independently comprises a matrix, a ferromagnetic particle, and a filler.

3. The sensor of claim 2, wherein each instance of the matrix independently comprises a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof.

4. The sensor of claim 2, wherein each instance of the matrix comprises a silicone rubber.

5. The sensor of claim 2, wherein each instance of the ferromagnetic particle independently comprises iron, cobalt, nickel, neodymium, boron, or any mixture thereof.

6. The sensor of claim 5, wherein each instance of the ferromagnetic particle comprises carbonyl iron.

7. The sensor of claim 2, wherein each instance of the filler independently comprises graphite, graphene, a carbon nanotube, carbon black, or any combination thereof.

8. The sensor of claim 7, wherein each instance of the filler comprises a multiwall carbon nanotube.

9. The sensor of claim 1, wherein the non-conductive elastomer comprises a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof.

10. The sensor of claim 9, wherein the non-conductive elastomer comprises a silicone rubber.

11. The sensor of claim 1, wherein the pH-sensitive hydrogel comprises a polymer comprising an amino group, a carboxylic acid group, an amide group, or any combination thereof.

12. The sensor of claim 11, wherein the polymer further comprises a vinyl alcohol monomer unit, a hydroxyethyl methacrylate monomer unit, an isooctyl acrylate monomer unit, a poly(ethylene glycol) dimethacrylate monomer unit, or any combination thereof.

13. The sensor of claim 1, wherein the pH-sensitive hydrogel comprises a polymer comprising an acrylic acid monomer unit, a methacrylic acid monomer unit, an acrylamide monomer unit, a methacrylamide monomer unit, an N,N-dimethylaminoethyl methacrylate monomer unit, a poly(ethylene glycol) dimethacrylate monomer unit, an ethyleneimine monomer unit or any combination thereof.

14. The sensor of claim 1, wherein the pH-sensitive hydrogel comprises a poly(vinyl alcohol)-poly(acrylic acid) polymer.

15. The sensor of claim 1, wherein the sensing layer comprises a non-conductive domain and a sensing domain disposed in the non-conductive domain, wherein the sensing domain comprises the pH-sensitive hydrogel.

16. The sensor of claim 15, wherein the sensing domain comprises a convex surface oriented towards the second electrode layer.

17. The sensor of claim 16, wherein the sensing domain is semi-spherical.

18. The sensor of claim 1, wherein
the dielectric layer directly contacts the first electrode layer and the second electrode layer; and
the sensing layer directly contacts the outer surface of the second electrode layer.

19. The sensor of claim 1, further comprising
a first electrical connection to the first electrode layer; and
a second electrical connection to the second electrode layer.

20. A method of determining pH, comprising
contacting a sample with the sensing layer of the sensor of claim 1;
measuring a capacitance between the first electrode layer and the second electrode layer; and
determining a pH of the sample based on the capacitance.

21. The method of claim 20, wherein determining the pH of the sample comprises comparing the capacitance to a calibration curve.

22. A sensor array comprising:
a first electrode layer;
a second electrode layer;
a dielectric layer disposed between the first electrode layer and the second electrode layer; and
a sensing layer disposed on an outer surface of the second electrode layer;
wherein
the first electrode layer comprises a plurality of first conductive domains extending parallel to a major axis;
the second electrode layer comprises a plurality of second conductive domains extending perpendicular to the major axis;
each of the first conductive domains and the second conductive domains independently comprises a magnetorheological elastomer;
the dielectric layer comprises a non-conductive elastomer; and
the sensing layer comprises a plurality of sensing domains comprising a pH-sensitive hydrogel, each disposed on a minor axis intersecting an instance of the plurality of first conductive domains and an instance of the plurality of second conductive domains.

23. The sensor array of claim 22, wherein each first conductive domain and second conductive domain independently comprises a magnetorheological elastomer comprising a matrix, a ferromagnetic particle, and a filler.

24. The sensor array of claim 23, wherein
the first electrode layer comprises a plurality of first non-conductive domains separating each of the plurality of first conductive domains; and
the second electrode layer comprises a plurality of second non-conductive domains separating each of the plurality of second conductive domains.

25. The sensor array of claim 24, wherein the sensing layer comprises one or more third non-conductive domains separating each of the plurality of sensing domains.

26. The sensor array of claim 25, wherein each first non-conductive domain, second non-conductive domain, and third non-conductive domain, and each instance of the matrix independently comprises a natural rubber, a silicone rubber, a bromobutyl rubber, a polychloroprene rubber, a polyurethane rubber, a polybutadiene rubber, a vinyl rubber, a nitrile rubber, an ethylene-acrylic rubber, an ethylene-propylene-diene monomer rubber, a thermoplastic rubber, or any combination thereof.

27. The sensor array of claim 22, wherein each instance of the pH-sensitive hydrogel independently comprises a polymer comprising an amino group, a carboxylic acid group, an amide group, or any combination thereof.

28. The sensor array of claim 22, wherein each sensing domain comprises a convex surface oriented towards the second electrode layer.

29. The sensor array of claim 22, further comprising
a plurality of first electrical connections, each independently to an instance of the plurality of first conductive domains; and
a plurality of second electrical connections, each independently to an instance of the plurality of second conductive domains.

30. A method of determining pH, comprising:
contacting a first sample with a first sensing domain of the sensor array of claim 22;
measuring a first capacitance between an instance of the plurality of first conductive domains and an instance of the plurality of second conductive domains intersecting a first minor axis extending through the first sensing domain;
determining a pH of the first sample based on the first capacitance;
contacting a second sample with a second sensing domain;
measuring a second capacitance between an instance of the plurality of first conductive domains and an instance of the plurality of second conductive domains intersecting a second minor axis extending through the second sensing domain; and
determining a pH of the second sample based on the second capacitance.

* * * * *